United States Patent
Jung et al.

(10) Patent No.: US 8,355,106 B2
(45) Date of Patent: Jan. 15, 2013

(54) DISPLAY PANEL

(75) Inventors: Min-Kyung Jung, Suwon-si (KR); Yong-Koo Her, Yongin-si (KR)

(73) Assignee: Samsung Display Co., Ltd. (KR)

(*) Notice: Subject to any disclaimer, the term of this patent is extended or adjusted under 35 U.S.C. 154(b) by 898 days.

(21) Appl. No.: 12/001,736

(22) Filed: Dec. 11, 2007

(65) Prior Publication Data

US 2008/0170168 A1  Jul. 17, 2008

(30) Foreign Application Priority Data

Jan. 15, 2007  (KR) .................. 10-2007-0004376

(51) Int. Cl.
G02F 1/1345  (2006.01)

(52) U.S. Cl. .................. 349/151; 349/149; 349/152

(58) Field of Classification Search .................. None
See application file for complete search history.

(56) References Cited

U.S. PATENT DOCUMENTS

| | | | | |
|---|---|---|---|---|
| 7,092,047 | B2* | 8/2006 | Jeon ................... | 349/43 |
| 7,375,790 | B2* | 5/2008 | Yun et al. ............ | 349/156 |
| 7,804,552 | B2* | 9/2010 | Yamazaki et al. .... | 349/44 |
| 7,898,631 | B2* | 3/2011 | Yang .................. | 349/153 |
| 2004/0150771 | A1* | 8/2004 | Lee ................... | 349/114 |
| 2008/0030667 | A1* | 2/2008 | Lee ................... | 349/150 |
| 2008/0079889 | A1* | 4/2008 | Lee et al. ............ | 349/151 |

FOREIGN PATENT DOCUMENTS

| | | |
|---|---|---|
| JP | 11-125834 A | 5/1999 |
| JP | 2000-155313 | 6/2000 |
| JP | 2000-275676 A | 10/2000 |
| JP | 2002-90720 | 3/2002 |
| JP | 2003-140129 A | 5/2003 |
| KR | 10-2006-0016881 | 2/2006 |

OTHER PUBLICATIONS

English Language Abstract, Publication No. JP200155313, Jun. 6, 2000, 1 p.
English Language Abstract, Publication No. JP2002090720, Mar. 27, 2002, 1 p.
Korean Patent Abstracts, Publication No. 1020060016881, Feb. 23, 2006, 1 p.

* cited by examiner

Primary Examiner — Thanh-Nhan P Nguyen
(74) Attorney, Agent, or Firm — Innovation Counsel LLP

(57) ABSTRACT

A display panel includes a first substrate having a pixel thin film transistor thereon and a second substrate opposing the first substrate. The first substrate further includes a first insulation substrate having a display region in which the pixel thin film transistor is formed and a non-display region that encloses the display region, gate lines formed in the display region and electrically connected to the pixel thin film transistor, a driving part, including a driving thin film transistor, located in the non-display region and driving the pixel thin film transistor, and a dummy semiconductor layer formed in a peripheral area of the driving part.

23 Claims, 17 Drawing Sheets

DISPLAY PANEL

RELATED APPLICATIONS

This application claims priority of Korean Patent Application No. 10-2007-0004376, filed Jan. 15, 2007, the entire disclosure of which is incorporated herein by reference.

BACKGROUND

The present invention relates to display panel in general, and more particularly, to display panel in which a gate driving part is formed directly on a substrate thereof.

Liquid crystal display devices (LCDs) typically include a display panel and a backlight unit. The display panel includes a first substrate on which a plurality of thin film transistors (TFTs) is formed, a second substrate opposing the first substrate, and a layer of a liquid crystal material located between the first and second substrates. Since the display panel does not itself emit light, it receives the light needed to form an image from the backlight unit, which is located in back of the first substrate.

Gate lines, data lines and the TFTs, which are respectively connected to associated ones of the gate lines and data lines, are formed on the first substrate. Image forming pixels are connected to respective ones of the TFTs, and the TFTs are used to control each pixel independently of the others.

A gate driving part and a data driving part are required for driving the gate lines and the data lines, respectively. Currently, to reduce the cost of the of the driving parts, the gate driving part is being formed directly on the first substrate.

The gate driving part that is formed on the first substrate includes a plurality of TFTs. The functional properties of the TFTs can change in response to the incidence of light thereon, and if the functional properties of the TFTs change, this can create an instability problem in the driving of the gate lines.

SUMMARY OF THE INVENTION

In accordance with the exemplary embodiments disclosed herein, display panels are provided that include means for ensuring that the gate lines of the display panels are not subject to the foregoing instability problem, and accordingly, are stably driven.

In one exemplary embodiment, a display panel includes a first substrate, comprising a pixel thin film transistor (TFT) and a second substrate opposing the first substrate. The first substrate further comprises a first insulation substrate, including a display region in which the pixel TFT is formed and a non-display region that encloses the display region, gate lines formed in the display region and electrically connected to the pixel TFT, and a driving part located in the non-display region that drives the pixel TFT and includes a driving TFT, and a dummy semiconductor layer formed in a peripheral area of the driving part.

In one aspect of this embodiment, the driving part may comprise a gate driving part that is connected to the gate lines and operable to drive the gate lines, and at least a part of the dummy semiconductor layer may be formed between the gate driving part and the display region. The dummy semiconductor layer may be formed in an outer portion of the gate driving part, and may comprise a semiconductor layer that functions as the dummy semiconductor layer. The dummy semiconductor layer and the gate lines may be spaced apart from each other.

In another aspect, the second substrate may comprise an inner black matrix formed in the display region, an outer black matrix formed in the non-display region, and the gate driving part may be located within the area of the outer black matrix. The outer black matrix may comprise an organic material, and the second substrate may further comprise a common electrode that has at least a part thereof formed in correspondence to the display region and that includes an opening corresponding to the gate driving part and disposed in facing opposition thereto.

In another aspect, the gate driving part may comprise first and second gate driving parts that are disposed on opposite sides of the first substrate, with the display region interposed therebetween, and the gate lines may be alternately connected to the first and second gate driving parts.

In another aspect, the first substrate may further comprise data lines intersecting the gate lines and electrically connected to the pixel TFT, and pixel electrodes electrically connected to the pixel TFT. Each pixel electrode may comprise first, second and third pixel electrodes, each of which is respectively connected with a different gate line. Two of the three pixel electrodes may be connected to the same data line. The first, second and third pixel electrodes may extend in the same direction as the gate lines and be sequentially driven.

In another aspect, at least a part of the dummy semiconductor layer is formed in an outer portion of the gate driving part between the gate driving part and the display region.

In another aspect, the driving TFT may comprise a semiconductor layer that functions as the dummy semiconductor layer.

In another aspect, the second substrate may comprise an inner black matrix formed in the display region and an outer black matrix formed on the non-display region, and the gate driving part may be located within the area of the outer black matrix.

In another aspect, the outer black matrix may comprise an organic material, and the second substrate may further comprise a common electrode, at least a part of which is formed in correspondence to the display region, and that includes an opening corresponding to the gate driving part and disposed in facing opposition thereto.

In another exemplary embodiment, a display panel includes a first substrate comprising a pixel TFT and a second substrate opposing the first substrate. The first substrate may further comprise a first insulation substrate, including a display region in which the pixel TFT is formed, and a non-display region that encloses the display region, gate lines formed in the display region and electrically connected to the pixel TFT, and a driving part located in the non-display region that drives the pixel TFTs and includes a driving TFT. The second substrate may comprise an outer black matrix formed in correspondence to the non-display region and a common electrode, at least a part of which is formed in correspondence to the display region, and that includes an opening corresponding to the driving part and disposed in facing opposition thereto.

According to one aspect of this embodiment, the driving part may comprise a gate driving part that is connected to and operable to drive the gate lines.

In another aspect, the outer black matrix may comprise an organic material.

In another aspect, the gate driving part is located within the area of the outer black matrix.

In another aspect, the first substrate may further comprise a dummy semiconductor layer formed in a peripheral area of the gate driving part.

In another aspect, at least a part of the dummy semiconductor layer may be formed between the gate driving part and the display region.

In another aspect, at least a part of the dummy semiconductor layer may formed in the outer portion of the gate driving part.

In another aspect, the driving TFT comprises a semiconductor layer that functions as the dummy semiconductor layer.

A better understanding of the above and many other features and advantages of the display panels s of the present invention may be obtained from a consideration of the detailed description below of some exemplary embodiments thereof, particularly if such consideration is made in conjunction with the appended drawings, wherein like reference numerals are used to identify like elements illustrated in one or more of the figures thereof.

DETAILED DESCRIPTION

Although an LCD and an LCD panel will be explained as an example of a display device and display panel respectively, the present invention may be applied to other display panels, such as organic light emitting diode (OLED) panel and electrophoresis display (EPD) panel.

Figure 1:
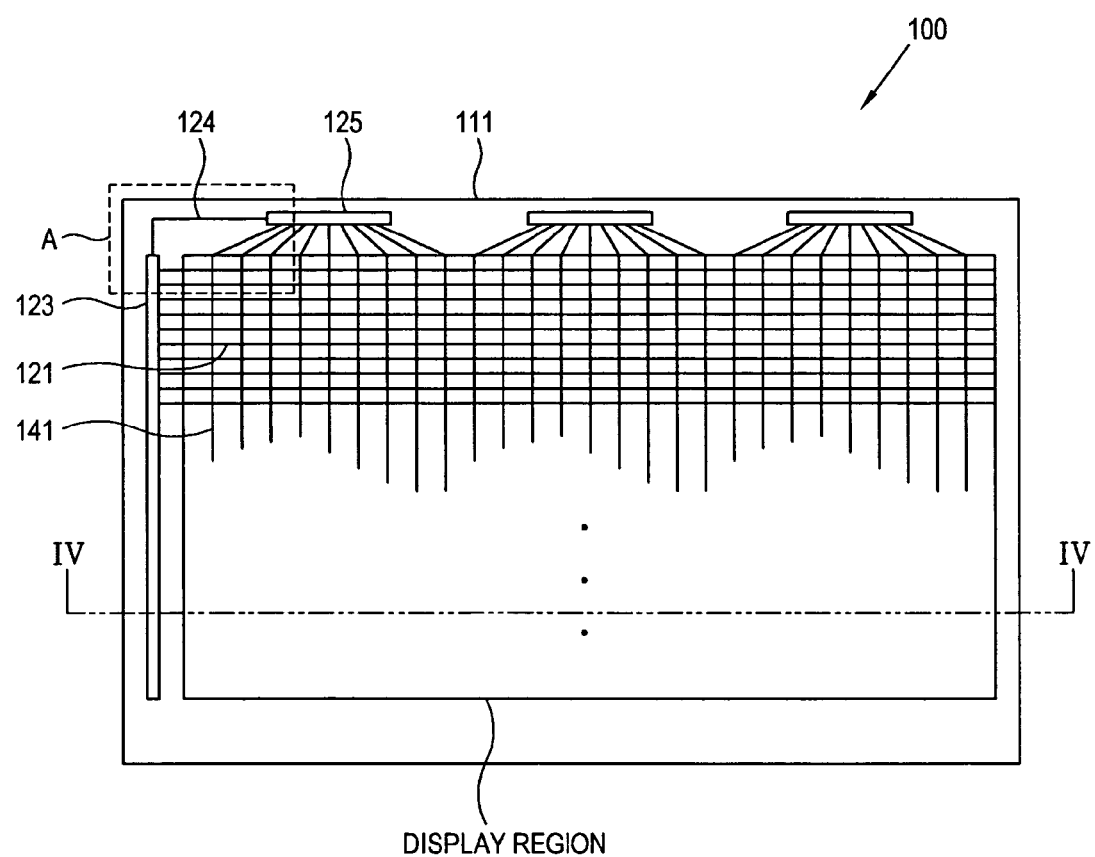
FIGS. 1 and 2 are partial schematic top plan views of a first exemplary embodiment of an LCD in accordance with the present invention.
Figure 2:
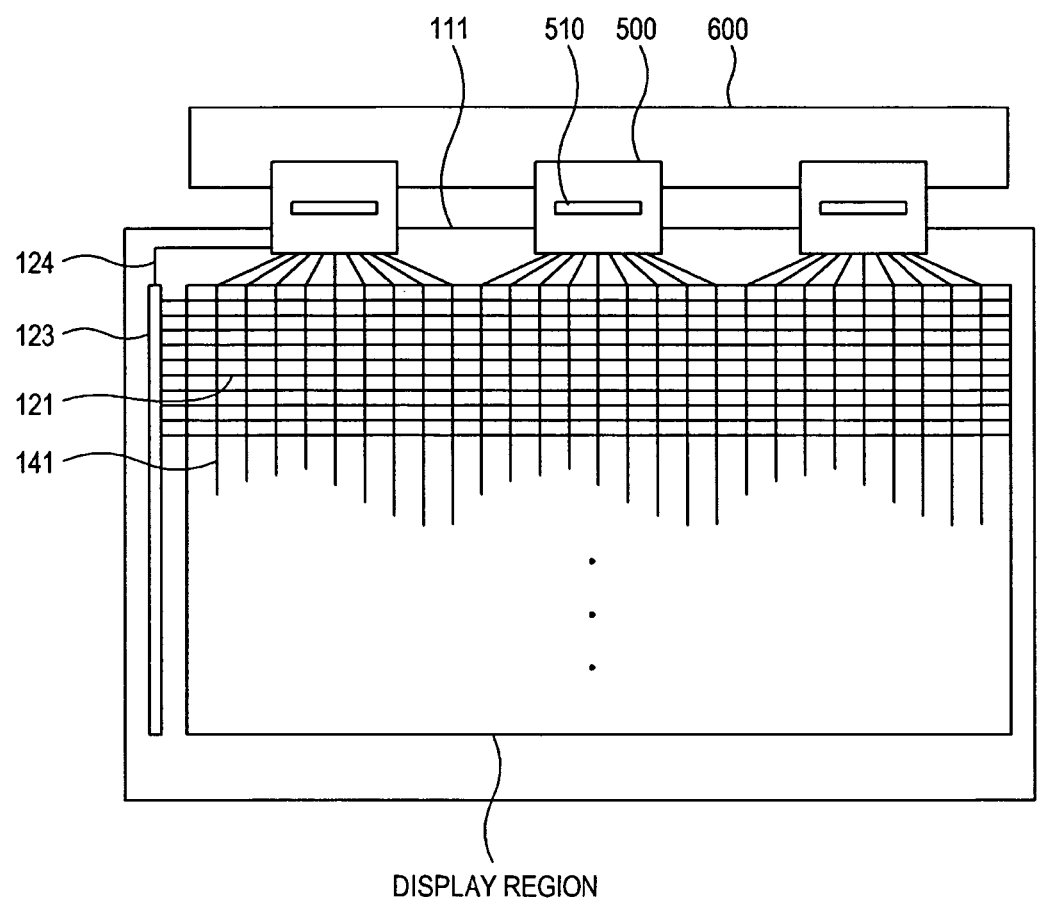

A first exemplary embodiment of an LCD in accordance with the present invention is described below with reference to FIGS. 1 through 6, wherein FIG. 1 illustrates an exemplary first substrate 100 of the device shown without flexible members 500 and an associated circuit substrate 600 thereof, and FIG. 2 illustrates the circuit substrate 600 thereof interconnected to the substrate 100 via the flexible members 500.

Figure 4:
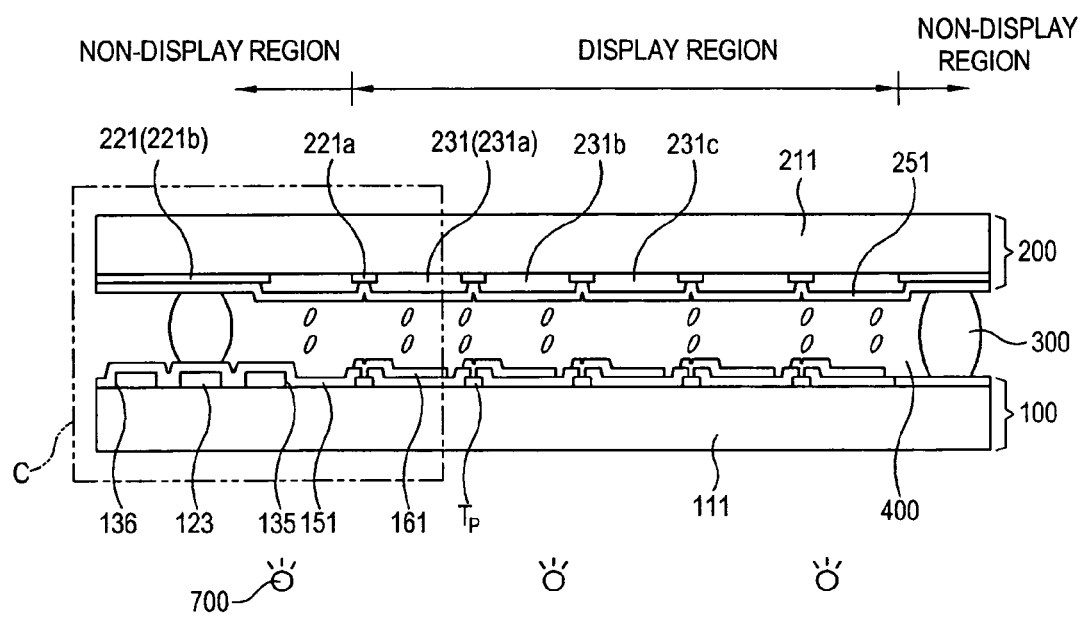
FIG. 4 is a cross-sectional view of the LCD of FIG. 1, as seen along the section lines IV-IV taken therein.

As illustrated in FIG. 4, the first exemplary LCD includes a first substrate 100 on which a plurality of pixel thin film transistors (Tp) are formed, a second substrate 200 that faces the first substrate 100, a sealant 300 that bonds the first and substrates 100 and 200 together at their edges, a layer of a liquid crystal material 400 that is sealed between the first and second substrates 100 and 200 by the sealant 300, and one or more light sources 700 that are located below the first substrate 100.

As illustrated in FIG. 2, the flexible members 500 are connected between the first substrate 100 and the circuit substrate 600. Although not shown in FIGS. 1 and 2, the LCD may further include an optical member located between the first substrate 100 and the light source 700. The optical member may include a prism film, a diffusion plate, a diffusion sheet, a reflective polarizing film or a protection film.

The first exemplary substrate 100 is divided into a display region and a non-display region that encloses the display region. The display region is described first with reference to FIGS. 1 through 6.

A gate wiring pattern is formed on a first insulation substrate 111. The gate wiring may be formed of a single layer or multiple layers of metal. The gate wiring includes gate lines 121 that extend generally laterally in the figures, and gate electrodes 122 that branch out from the gate lines 121. Although not illustrated in the figures, the gate wiring may further include storage electrode lines that overlap pixel electrodes 161 to form individual pixel voltage storage capacitors.

A gate insulation film 131 of, e.g., silicon nitride (SiNx) or the like, is formed to cover the gate wiring. A semiconductor layer 132 of amorphous silicon is formed on the gate insulation film 131 of the gate electrodes 122, and an ohmic contact layer 133 comprising, e.g., silicide or n$^+$ hydrogenated amorphous silicon that is heavily doped with n-type impurities, is formed on the semiconductor layer 132. The ohmic contact layer 133 is separated into two parts.

A data wiring is formed on the ohmic contact layer 133 and the gate insulation film 131. The data wiring may also be formed of a single layer or multiple layers of metal. The data wiring includes data lines 141 that extend generally longitudinally in the figures so as to intersect the gate lines 121 generally orthogonally, but are electrically insulated from the gate lines by the gate insulation film 131. The data lines include source electrodes 142 that branch out from the data lines 141 and extend over the ohmic contact layer 133, and drain electrodes 143 that are separated from associated ones of the source electrodes 142 and extend over the ohmic contact layer 133.

A passivation film 151 of, e.g., silicon nitride or the like, is formed on the data wiring and the semiconductor layer 132 that is not covered by the data wiring. Contact holes 152 that expose respective ones of the drain electrodes 143 therethrough are formed in the passivation film 151.

A plurality of pixel electrodes 161 is formed on the passivation film 151. The pixel electrodes 161 are made of a transparent conductive material, e.g., indium tin oxide (ITO) or indium zinc oxide (IZO). Each of the pixel electrodes 161 is connected with a corresponding pixel thin film transistor (Tp) through a corresponding contact hole 152.

With reference to FIGS. 1 through 6, the structure of the non-display region of the first exemplary substrate 100 is as follows.

Referring to FIG. 1, a gate driving part 123 operable to drive the gate lines 121 is formed in the non-display region of the substrate located at the left side of the display region. The gate driving part 123 is formed simultaneously with the formation of the pixel thin film transistors (Tp).

Figure 3:
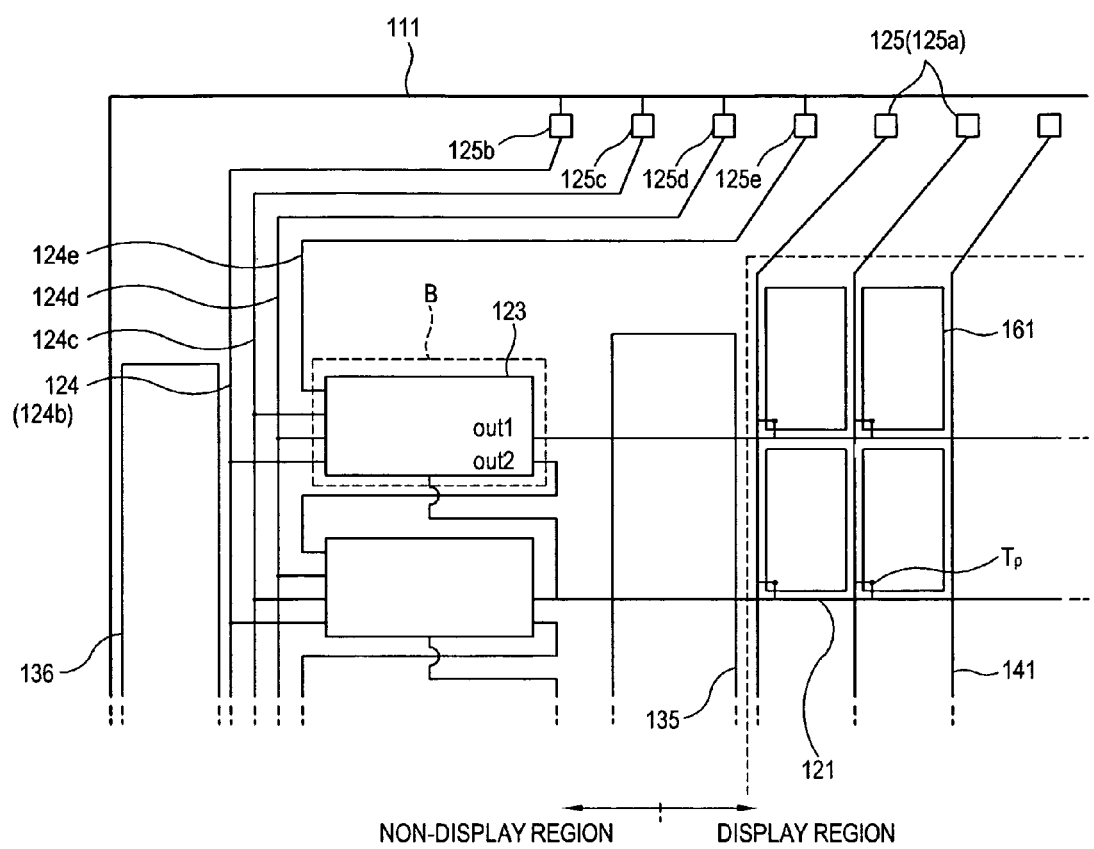
FIG. 3 is an enlarged plan view of the portion "A" outlined by the dashed line in FIG. 1.

Referring to FIGS. 2 and 3, the gate driving part 123 receives a gate driving signal from the circuit substrate 600 via the flexible members 500, a pad portion 125 and a gate connection wiring 124. The driving signal includes, among others, a first clock signal (CKV), which is a gate-on voltage, a second clock signal (CKVB), which has a phase that is reversed relative to that of the first clock signal (CKV), a scan start signal (STVP), and a gate-off voltage (Voff).

The pad portion 125 includes a data pad 125a, which receives a data signal, and signal pads 125b through 125e, which respectively receive the gate-off voltage (Voff), the first clock signal (CKV), the second clock signal (CKVB), and the scan start signal (STVP).

The gate connection wiring 124 includes a plurality of sub-connection wirings 124b through 124e that are respectively connected to the signal pads 125b through 125e.

A first gate driving part 123 that is connected with a corresponding first gate line 121 outputs a gate-on voltage in synchronization with the scan start signal and the clock signal. A second gate driving part 123 that is connected with a corresponding second gate line then outputs the gate-on voltage in synchronization with the output voltage of the first gate driving part 123 and the clock signal, and so on, in sequential order, to a last gate driving part 123 in the column thereof. The end of the gate-on voltage output of each gate driving part 123 is thus closely synchronized to the point in time at which the output of the next gate driving part 123 begins.

Figure 5:
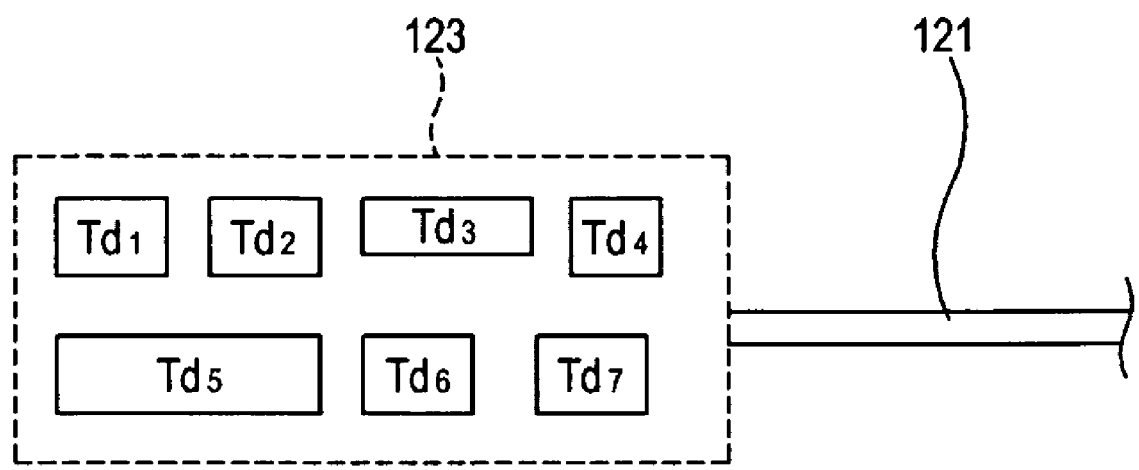
FIG. 5 is an enlarged plan view of the portion "B" outlined by the dashed line in FIG. 3.
Figure 6:
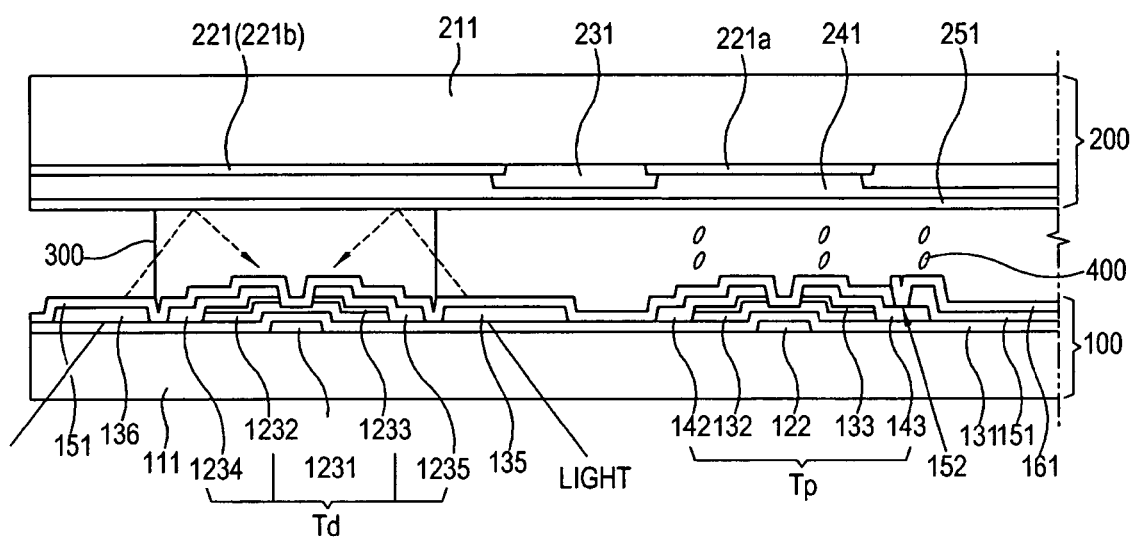
FIG. 6 is an enlarged elevation view the portion "C" outlined by the dashed line in FIG. 4.

Referring to FIG. 5, a plurality of driving thin film transistors (Td1 through Td7) are formed in each of the gate driving parts 123. In FIG. 6, only one of the driving thin film transistors (Td) of the plurality thereof is shown in cross-section.

Referring to FIG. 6, the driving thin film transistor (Td) illustrated includes a gate electrode 1231, a semiconductor layer 1232, an ohmic contact layer 1233, a source electrode 1234 and a drain electrode 1235. The structure of the driving thin film transistors (Td) is substantially similar to that of the pixel thin film transistors (Tp), and accordingly, further detailed description thereof is omitted for brevity.

In the exemplary embodiment of FIG. 6, "dummy" semiconductor layers 135 and 136 are formed between the gate driving part 123 and the display region and in an outer portion of the gate driving part 123. The dummy semiconductor layers 135 and 136 are formed of the same material and in same layer as the semiconductor layer 1232 of the driving thin film transistors (Td). The role of the dummy semiconductor layers 135 and 136 is described in more detail below.

The structure of the exemplary second substrate 200 is described below with reference to FIGS. 4 and 6.

A black matrix 221 is formed on a second insulation substrate 211. The black matrix 221 includes an inner black matrix 221a, which is located in the display region and over the pixel thin film transistors (Tp), and an outer black matrix 221b, which is formed around the display region.

In general, the inner black matrix 221a is disposed interstitially between red, green and blue color filters, and prevents light from radiating directly onto the pixel thin film transistors (Tp) located on the first substrate 100. The outer black matrix 221b is formed so as to cover all of the gate driving parts 123, and functions in a similar manner. The black matrix 221 may be made of chrome or an organic photoresist material in which a black pigment is added. Carbon black, titanium oxide, or the like, may be used as the black pigment.

The color filters 231 are formed within the interstices of the inner black matrix 221a, and include three sub-layers 231a, 231b, and 231c, each having one of red, green or blue colors, respectively. The color filters 231 respectively imbue the light that is radiated from the light sources 700 and passes through the liquid crystal layer 400 with respective, corresponding colors. The color filters 231 may be formed of an organic photoresist material.

An overcoat layer 241 is formed over the color filters 231 and the black matrix 221. The overcoat layer 241 is made of an organic material, and serves to provide a planar surface.

A common electrode 251 is formed on the overcoat layer 241. The common electrode 251 is formed over the whole surface of the second substrate material 211, and is made of a transparent conductive material, e.g., ITO, IZO, or the like. The common electrode 251, together with the pixel electrodes 161 of the first substrate 100, applies respective pixel voltages directly to the liquid crystal layer 400.

The sealant 300 bonds the first and second substrates 100 and 200 together, and is located on the outer black matrix 221b. The sealant 300 includes an epoxy resin and an acrylic resin as its main ingredients, an amine-series hardener, a filler material, such as aluminum oxide powder, and a solvent, such as propylene-glycol-diacetate. The sealant 300 determines the spacing, or "cell gap," between the substrates 100 and 200. Spacers made of glass or plastic may also be located in the sealant 300 for this purpose.

The liquid crystal layer 400 is located between the first and second substrates 100 and 200. The alignment of the molecules of the liquid crystal layer 400 changes in response to the respective electric fields formed between the pixel electrodes 161 and the common electrode 251 to independently control the transmissivity of the light passing through each pixel of the display panel.

The light sources 700 may be surface light sources, lamps or a light-emitting diodes. The lamps may be cold cathode fluorescent lamps or external electrode fluorescence lamps.

In the first exemplary LCD of the present invention, the amorphous silicon used as the semiconductor layer 1232 of the driving thin film transistor (Td) is the same as that used as the semiconductor layer 132 of the pixel thin film transistor (Tp). Amorphous silicon becomes unstable if it is irradiated with light. The unstable amorphous silicon causes an increase in the on-current (Ion) of the driving thin film transistors (Td), thereby increasing power consumption.

Most of the light that is incident on the semiconductor layer 1232 of the driving thin film transistors (Td) is emitted from the light sources 700. As illustrated in FIG. 6, the light emitted from the light sources 700 passes through the first substrate 100, and ordinarily, would be reflected back from the outer black matrix 221b or the common electrode 251 of the second substrate 200 so as to impinge on the driving thin film transistors (Td). However, in the first exemplary embodiment of the present invention, the dummy semiconductor layers 135 and 136 are located on opposite sides of the gate driving part 123. Therefore, the light emitted from the light sources 700 is blocked by the dummy semiconductor layers 135 and 136, and as a result, does not impinge on the driving thin film transistors (Td).

Thus, in accordance with the first exemplary LCD embodiment, the operation of the driving thin film transistors (Td) is stabilized, the gate lines 121 are therefore driven stably and the power consumption of the LCD is thereby reduced.

In the other exemplary LCD embodiments described herein, the semiconductor layer 1232 may be formed of polysilicon. In these embodiments, if the respective outer portions of the gate driving parts 123 are sufficiently masked or obscured from the light by the sub-connection wirings 124b through 124e, the dummy semiconductor layer 136 may be omitted.

A process for manufacturing the first exemplary LCD above is described below with reference to FIG. 7A through 7E.

Figure 7A:
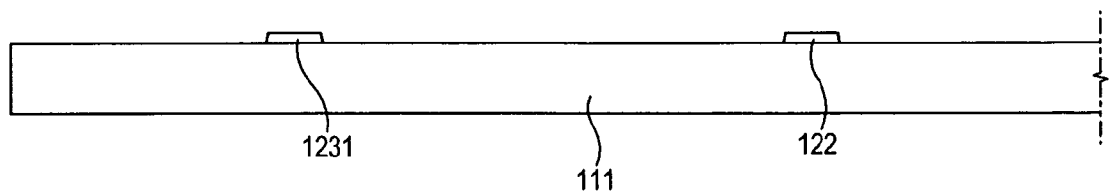
FIGS. 7A through 7E are partial cross-sectional views illustrating sequential steps of a method for manufacturing the first exemplary LCD.

First, as illustrated in FIG. 7A, a metal layer is formed on the first insulating substrate 111 and patterned to form gate electrodes 122 and 1231.

Figure 7B:
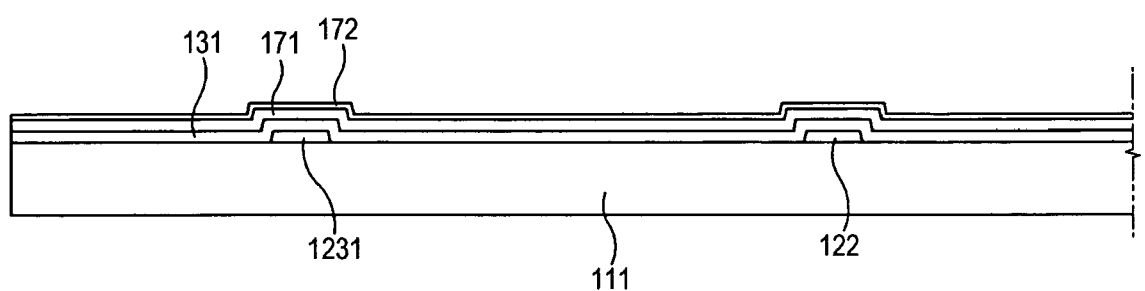

Then, as illustrated in FIG. 7B, a gate insulation film 131, an amorphous silicon layer 171, and an n+ amorphous silicon layer 172 are formed. The gate insulation film 131, the amorphous silicon layer 171 and the n+ amorphous silicon layer 172 may be successively formed using a chemical vapor deposition method.

Figure 7C:
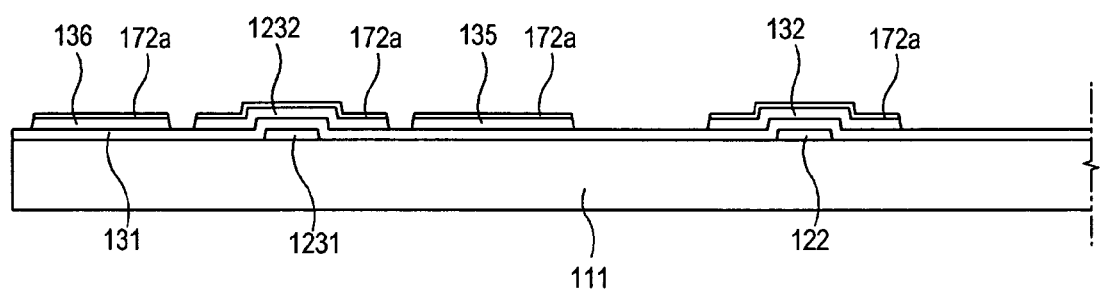

Then, as illustrated in FIG. 7C, the amorphous silicon layer 171 and n+ amorphous silicon layer 172 are patterned to form the semiconductor layers 132 and 1232 and the dummy semiconductor layers 135 and 136. At this point, a patterned n+ amorphous silicon layer 172a is formed on the semiconductor layers 132 and 1232 and the dummy semiconductor layers 135 and 136, but are not yet separated into two parts.

Figure 7D:
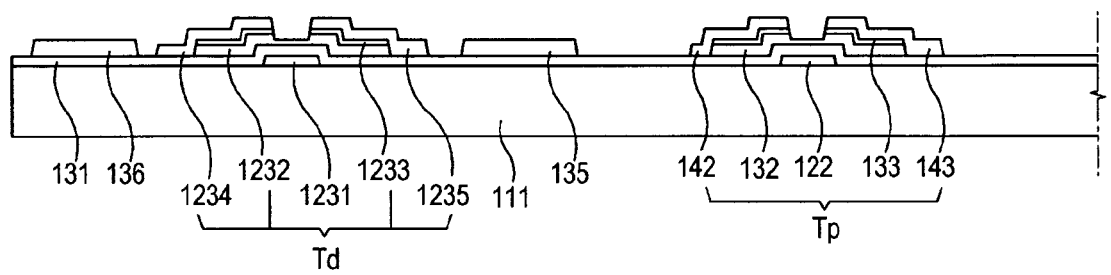

Next, as illustrated in FIG. 7D, a metal layer is deposited and patterned to form source electrodes 142 and 1234 and drain electrodes 143 and 1235 and thereby form the pixel thin film transistors (Tp) and the driving part thin film transistors (Td). This step includes processes of etching and removing the exposed patterned n+ amorphous silicon layer 172a after having formed the respective source electrodes 142 and 1234 and drain electrodes 143 and 1235.

The patterned n+ amorphous silicon layer 172a is then divided into two separate parts through etching the patterned n+ amorphous silicon layer 172a, and thus, the ohmic contact layers 133 and 1233 are formed. In addition, the patterned n+ amorphous silicon layer 172a located on the dummy semiconductor layers 135 and 136s is removed.

As will be appreciated, the respective thicknesses of the dummy semiconductor layers 135 and 136 and the semiconductor layers 132 and 1232 of the transistor channel regions decrease slightly during the etching of the patterned n+ amorphous silicon layer 172a.

Figure 7E:
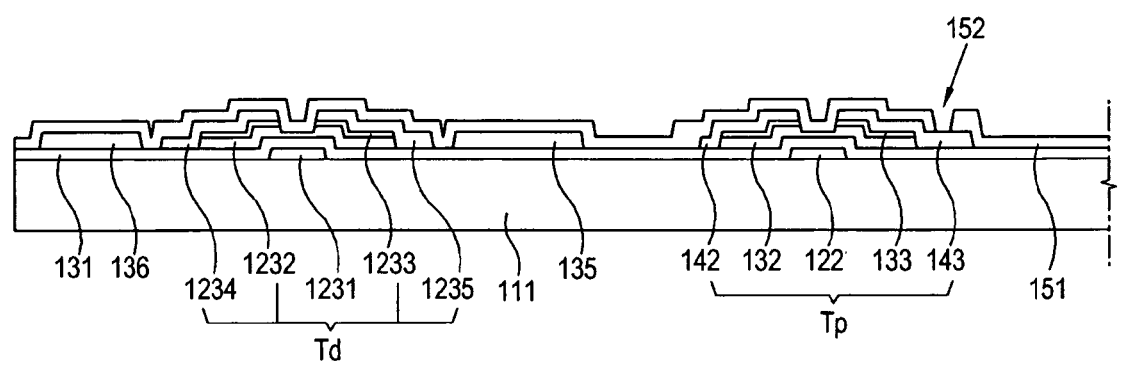

Thereafter, as illustrated in FIG. 7E, a passivation film 151 is formed over the structure and the contact holes 152 are formed therein.

The pixel electrodes 161 are then formed to complete the first exemplary substrate 100.

The formation of the second substrate 200, the assembly of the two substrates 100 and 200 and the disposition of the liquid crystal layer 400 therebetween are performed by known methods, and further detailed description of these is therefore omitted for brevity.

Figure 8:
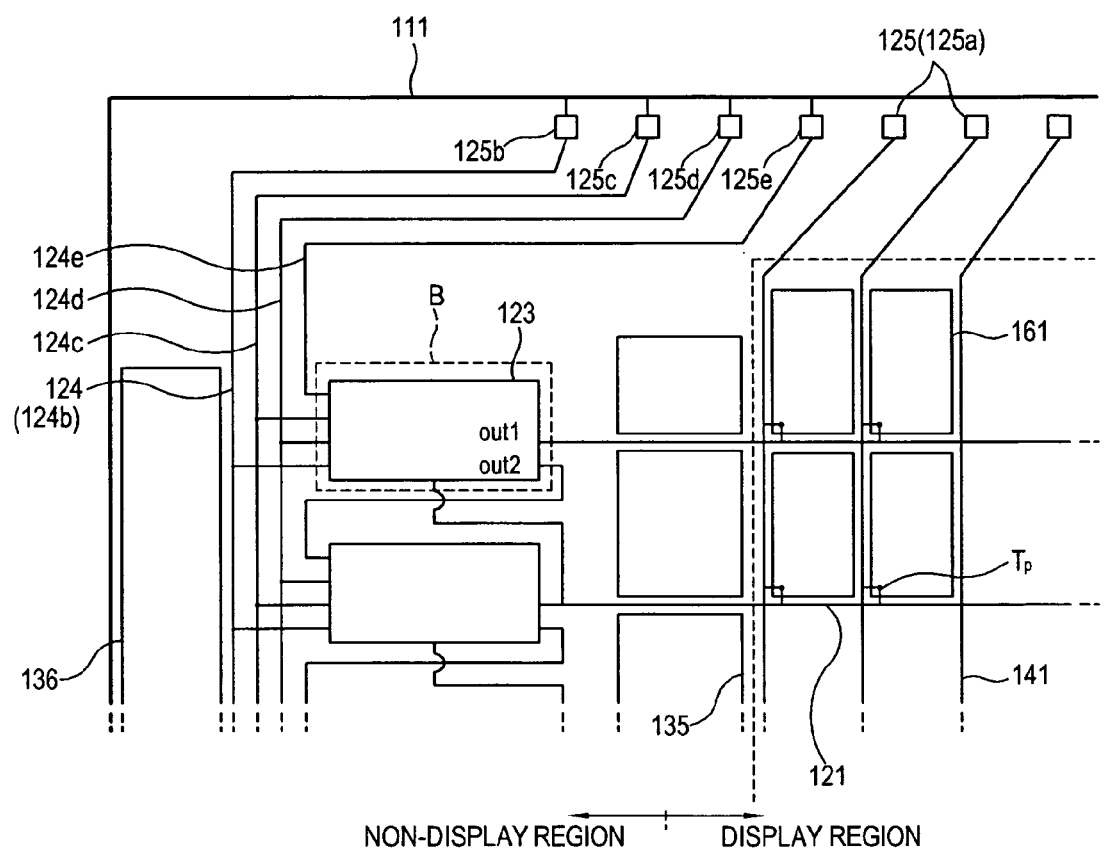
FIG. 8 is a partial schematic plan view a second exemplary embodiment of an LCD in accordance with the present invention.

A second exemplary embodiment of an LCD in accordance with the present invention is described below with reference to FIG. 8.

In the second exemplary embodiment, dummy semiconductor layers 135 and 136 are spaced apart from gate lines 121. That is, the dummy semiconductor layer 135 is formed between the gate lines 121, and is formed in multiple areas that are separated from each other. Thus, in accordance with the second exemplary embodiment, the formation of undesirable parasitic capacitances between the dummy semiconductor layers 135 and 136 and the gate lines 121 is thereby suppressed.

Figure 9:
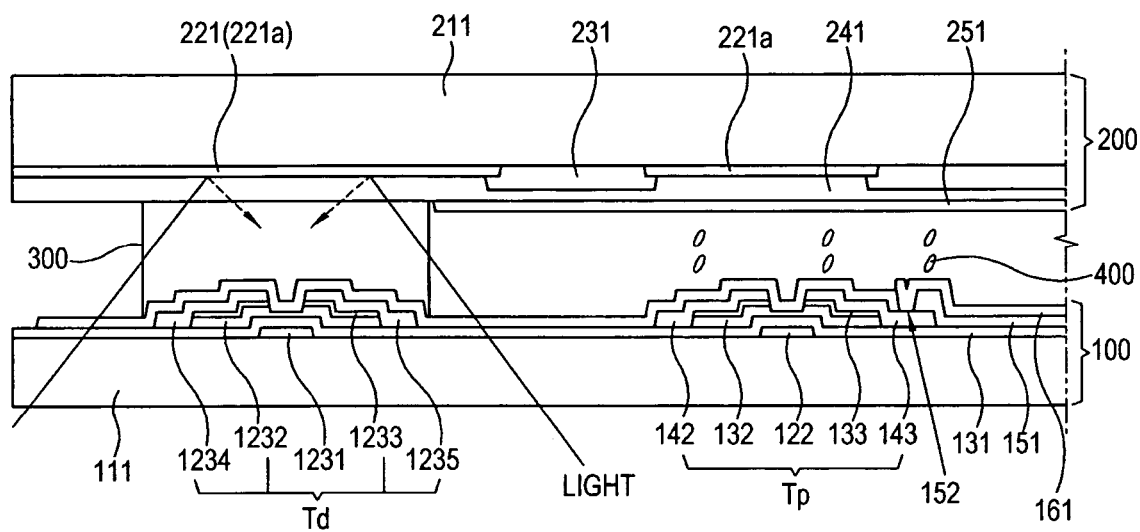
FIG. 9 is a partial cross-sectional view of a third exemplary embodiment of an LCD in accordance with the present invention.

A third exemplary LCD embodiment is described below with reference to FIG. 9.

In the third exemplary LCD, the dummy semiconductor layers 135 and 136 are omitted, and instead, a black matrix 121 made of an organic material is provided. As illustrated in FIG. 9, the common electrode 251 is patterned to incorporate one or more openings that correspond in size and shape to the respective driving parts 123 and are disposed over, i.e., in facing opposition, to them.

Of the light emitted from light sources 700, the light that is incident between the gate driving part 123 and the display region is incident on the second substrate 200. It should be noted that, by virtue of the openings, a common electrode 251 having an excellent reflectivity is not located directly over the gate driving parts 123, but instead, an outer black matrix 221b having an inferior reflectivity is located over the gate driving parts 123. As a result, the light which is incident on the outer black matrix 221b is not reflected from the outer black matrix 221b, but instead, is mostly absorbed by the outer black matrix 221b. Accordingly, the amount of light that is incident on the semiconductor layer 1232 of the driving thin film transistor (Td) is substantially decreased.

In addition, according to the third exemplary embodiment, since the common electrode 251 is absent in the areas of the second substrate 200 corresponding to the gate driving parts 123, the formation of undesirable parasitic capacitance between the gate driving parts 123 and the common electrode 251 is also prevented.

An additional consideration is that, in the event the sealant 300 is not fully hardened, ion impurities may be adsorbed by the gate driving parts 123 as the result of a voltage difference between the gate driving parts 123 and the common electrode 251. As a result, corrosion can occur in the gate driving parts 123. However, in the third exemplary embodiment, since the common electrode 251 is not formed in the areas of the second substrate 200 corresponding to the gate driving parts 123, corrosion of the gate driving parts 123 is prevented from occurring.

Figure 10:
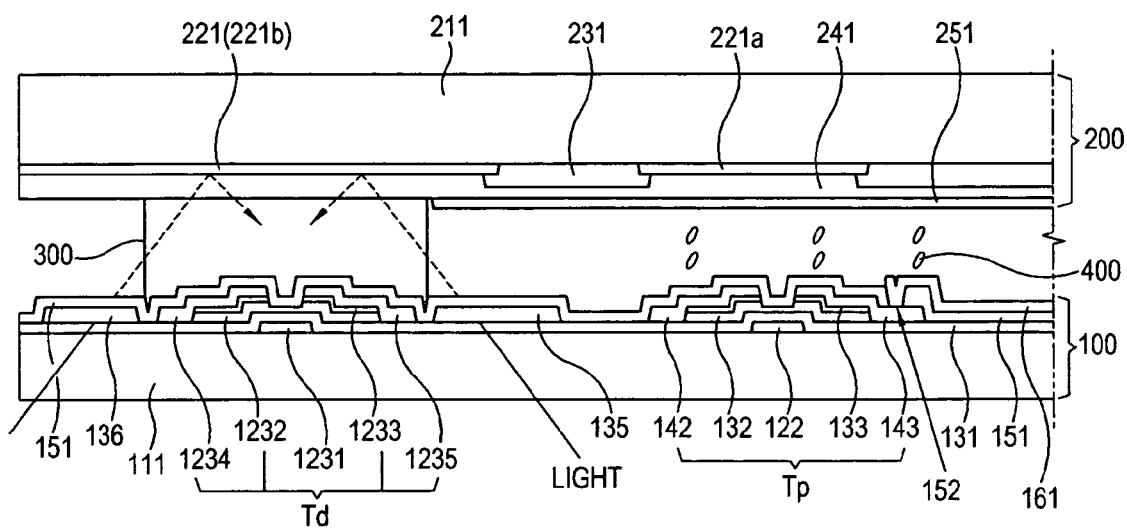
FIG. 10 is a partial cross-sectional view of a fourth exemplary embodiment of an LCD in accordance with the present invention.

A fourth exemplary embodiment of an LCD in accordance with the present invention is described below with reference to FIG. 10.

In the fourth exemplary LCD embodiment, dummy semiconductor layers 135 and 136 are provided, as well as a black matrix 221 made of an organic material having an inferior reflectivity. In addition, the common electrode 251 is patterned so as not to exist over the gate driving parts 123, that is, so as to include one or more openings corresponding to the gate driving parts 123 that are disposed in facing opposition thereto.

Most of the light that is incident on the periphery of the gate driving parts 123 is intercepted by the dummy semiconductor layers 135 and 136, and thus, does not impinge on the second substrate 200. The light that is incident on the second substrate 200 is mostly absorbed by the outer black matrix 221b. Accordingly, the amount of light that impinges on the semiconductor layer 1232 of the driving thin film transistors (Td) is substantially diminished.

A fifth exemplary embodiment of an LCD in accordance with the present invention is described below with reference to FIGS. 11 through 13.

Figure 11:
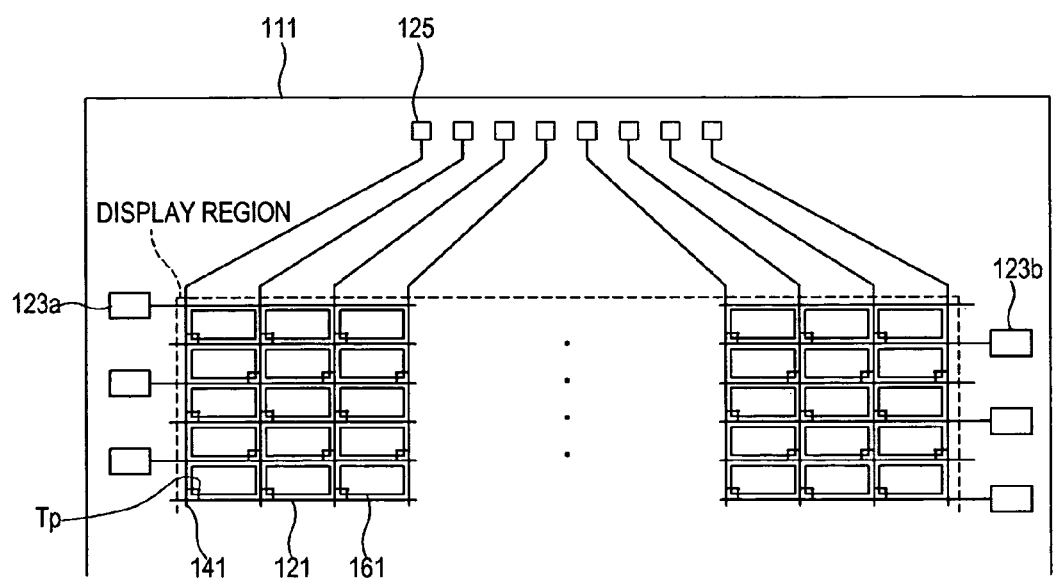
FIG. 11 is a partial schematic top plan view of a fifth exemplary embodiment of an LCD in accordance with the present invention.

Referring to FIG. 11, successive rows of pixel electrodes 161 having a generally rectangular shape are formed so as to extend in the direction of gate lines 121. Three longitudinally adjacent pixel electrodes 161 form one pixel. The three pixel electrodes 161 forming one pixel are each connected to a different gate line 121. Additionally, the three pixel electrodes 161 are connected in alternating fashion to adjacent left and right data lines, as illustrated schematically in FIG. 11.

Thus, in the fifth exemplary LCD, the three pixel electrodes 161 that form one pixel are arranged along the direction of extension of the gate lines 121, and are connected in alternating fashion to a pair of adjacent data lines 141. Accordingly, in the fifth exemplary embodiment, to implement the same number of the pixels as in the first exemplary embodiment above, the number of gate lines 121 increases by a factor of three, whereas, the number of data lines 141 decreases by a factor of ⅓.

As illustrated in FIG. 11, the gate driving parts 123 include a column of first gate driving parts 123a that are formed in the non-display region located at the left side of the display region, and a column of second gate driving parts 123b that are formed in the non-display region located at the right side of the display region. Odd-numbered gate lines 121 are respectively connected to the first gate driving parts 123a, and even-numbered gate lines 121 are respectively connected to the second gate driving parts 123b.

Generally speaking, the circuitry for data lines 141 is more complex and expensive than that for gate lines 121. However, since the number of data lines 141 is decreased by ⅓ in this embodiment, this results in a net decrease in the circuitry for driving the data lines 141, and thus, a decrease in LCD manufacturing costs.

Conversely, since the number of gate lines 121 increases by a factor of three, the manufacturing cost of the circuitry for the gate lines 121 likewise increases. However, in the present invention, since the gate lines 121 are driven with gate driving parts 123 that are formed directly on the first insulation substrate 111, no net increase in circuit costs results.

Additionally, since the pixel electrodes 161 extend in the row direction, and thus, the intervals between the gate lines 121 decreases, the space available for the gate driving parts 123 is accordingly limited. However, because the gate driving parts 123 are divided into two groups disposed on opposite sides of the display region, the space needed for the gate driving parts 123 is readily available.

Driving of the fifth exemplary LCD is described below with reference to FIG. 12.

If a gate-on voltage is supplied to an (n−1)th gate line 121, the pixel thin film transistors (Tp) which are connected with the (n−1)th gate line 121 are turned on. Responsively, the pixel electrodes 161 of a row (a) which is connected with the (n−1)th gate line 121 are turned on.

Then, a gate-on voltage is supplied to an (n)th gate line 121. Accordingly, the pixel electrodes 161 of a row (b) which is connected with the (n)th gate line 121 are turned on.

Thereafter, proceeding in this manner, if the gate-on voltage is supplied to an (n+1)th gate line 121, the pixel electrodes 161 of a row (c) are turned on. As a result, the display of one row of pixels is completed. Here, three gate lines 121 are sequentially driven to display one row of pixels, and the data lines 141 supply a data voltage corresponding to respective pixel electrodes 161 according to the driving of the gate lines 121.

Figure 12:
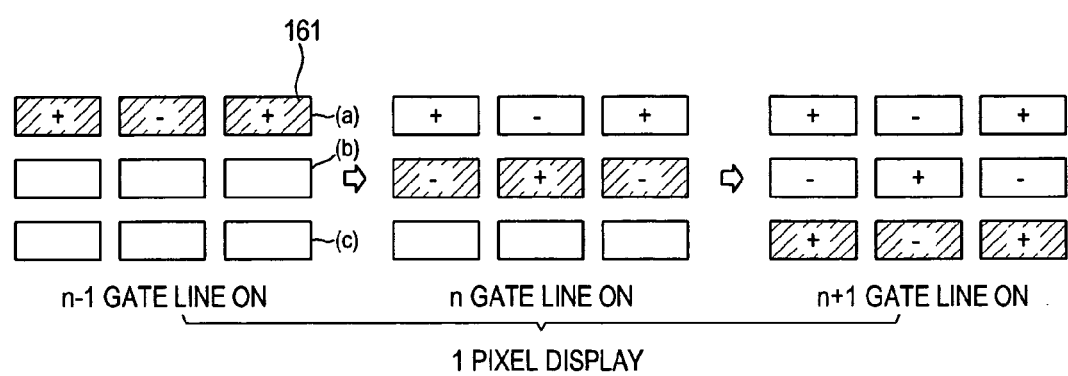
FIG. 12 is a diagram illustrating the driving of the fifth exemplary LCD.

Additionally, the polarity of the voltages applied to the respective pixel electrodes 161 is controlled so as to effect "dot inversion," as indicated schematically in FIG. 12.

Figure 13:
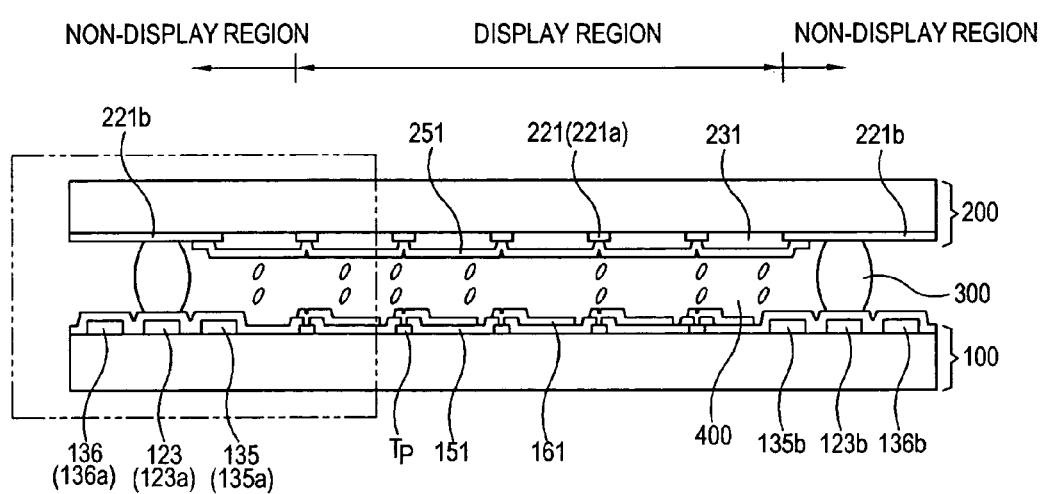
FIG. 13 is a partial cross-sectional view of the fifth exemplary LCD.

Referring to FIG. 13, the dummy semiconductor layers 135 and 136 of the fifth LCD embodiment include left dummy semiconductor layers 135a and 136a, which are respectively provided at the left and right sides of the first gate driving parts 123a, and right dummy semiconductor layers 135b and 136b, which are respectively provided at the left and right sides of the second gate driving parts 123b.

In addition, the common electrode 251 is not formed, or includes openings, over the first gate driving parts 123a and the second gate driving parts 123b, as described above.

In accordance with the various exemplary embodiments described herein, the light which is incident on the gate driving part 123 is decreased by the dummy semiconductor layers 135 and 136 and the patterned common electrode 251. Therefore, the operation of the gate driving parts 123 does not become unstable as a result of light impinging on them, either externally, i.e., from the outside of the LCD, or internally, i.e., from the light sources 700.

As those of skill in this art will by now appreciate, many modifications, substitutions and variations can be made in and to the materials, methods and configurations of the display panels of the present invention without departing from its spirit and scope. Accordingly, the scope of this invention should not be limited to that of the particular embodiments illustrated and described herein, as they are only by way of some examples thereof, but instead, should be commensurate with that of the claims appended hereafter and their functional equivalents.

What is claimed is:

1. A display panel, comprising:
a first substrate having a display region in which a pixel thin film transistor is formed and a non-display region surrounding the display region;
a gate line electrically connected to the pixel thin film transistor;
a data line crossing the gate line and electrically connected to the pixel thin film transistor;
a gate driving part electrically connected to the gate line and driving the pixel thin film transistor; and,
a dummy semiconductor layer formed between the gate driving part and the display region and crossing the gate line; and
a second substrate opposing the first substrate,
wherein the dummy semiconductor layer is substantially parallel to the data line and comprises a substantially linear shape extended along the data line.

2. The display panel of claim 1, wherein:
the second substrate comprises an inner black matrix formed in the display region and an outer black matrix formed in the non-display region; and,
the gate driving part is located within the area of the outer black matrix.

3. The display panel of claim 2, wherein:
the outer black matrix comprises an organic material; and,
the second substrate further comprises a common electrode having at least a portion formed in correspondence to the display region and an opening formed in correspondence to the gate driving part and disposed in facing opposition thereto, the common electrode partially overlapping with the outer black matrix.

4. The display panel of claim 1, wherein:
the gate driving part comprises a first and second gate driving parts disposed on opposite sides of the first substrate, with the display region interposed therebetween; and,
the gate lines are alternately connected with the first and second gate driving parts.

5. The display panel of claim 4, wherein the first substrate further comprises:
a pixel electrode electrically connected to the pixel thin film transistor,
wherein the pixel electrode comprises first, second and third pixel electrodes defining one pixel, and
the first, second and third pixel electrodes are respectively connected to different gate lines.

6. The display panel of claim 5, wherein two of the first, second and third pixel electrodes are connected to the same data line and extend in the same direction as the gate lines.

7. The display panel of claim 6, wherein the first, second and third pixel electrodes are sequentially driven.

8. The display panel of claim 1, wherein at least a part of the dummy semiconductor layer is formed in an outer portion of the gate driving part.

9. The display panel of claim 8, wherein the second substrate comprises:
an inner black matrix formed in the display region; and,
an outer black matrix formed in the non-display region, and wherein
the gate driving part is located within the area of the outer black matrix.

10. The display panel of claim 9, wherein:
the outer black matrix comprises an organic material; and,
the second substrate further comprises a common electrode having at least a portion formed in correspondence to the display region and an opening formed in correspondence to the gate driving part and disposed in facing opposition thereto, the common electrode partially overlapping with the outer black matrix.

11. The display panel of claim 1, wherein the dummy semiconductor layer comprises amorphous silicon.

12. The display panel of claim 1,
wherein the dummy semiconductor layer is a first dummy semiconductor layer, and a second dummy semiconductor layer is further formed between the gate driving part and an edge of the first substrate.

13. The display panel of claim 12,
wherein the first and second dummy semiconductor layers are substantially parallel to each other.

14. The display panel of claim 1,
wherein the dummy semiconductor layer is a first dummy semiconductor layer, a second dummy semiconductor layer is further formed in the non-display region, and the first and second dummy semiconductor layers are substantially parallel to each other.

15. A display panel, comprising:
a first substrate, comprising a pixel thin film transistor; and
a second substrate opposing the first substrate,
wherein the first substrate further comprises:
a first insulation substrate, including a display region in which the pixel thin film transistor is formed and a non-display region enclosing the display region;
gate lines electrically connected to the pixel thin film transistor; and
data lines crossing the gate lines and electrically connected to the pixel thin film transistor;
a driving part, including a gate driving part connected to the gate lines and configured to drive the gate lines, located in the non-display region and driving the pixel thin film transistor, and
wherein the second substrate further comprises:
an outer black matrix formed in correspondence to the non-display region; and
a common electrode, at least a portion of which is formed in correspondence to the display region, and having an opening corresponding to the driving part and disposed in facing opposition thereto, the common electrode partially overlapping with the outer black matrix,
wherein the first substrate further comprises a light-blocking dummy semiconductor layer formed in a peripheral area of the gate driving part, at least a part of the dummy semiconductor layer is formed between the gate driving part and the display region, crosses the gate lines and is oriented substantially parallel to the data lines, and the dummy semiconductor layer is further formed between the gate driving part and an edge of the first substrate.

16. The display panel of claim 15, wherein the outer black matrix comprises an organic material.

17. The display panel of claim 15, wherein the gate driving part is located within the area of the outer black matrix.

18. A display panel, comprising:
a first substrate having a display region in which a pixel thin film transistor is formed, and a non-display region surrounding the display region;
a gate line electrically connected to the pixel thin film transistor;
a data line crossing the gate line and electrically connected to the pixel thin film transistor;
a gate driving part electrically connected to the gate line and driving the gate line;
a dummy semiconductor layer formed adjacent to the display area and crossing the gate line; and
a second substrate opposing the first substrate,
wherein the dummy semiconductor layer is substantially parallel to the data lines and has a substantially linear shape extended along the data line.

19. The display panel of claim 18, wherein the dummy semiconductor layer comprises amorphous silicon.

20. The display panel of claim 18,
wherein the dummy semiconductor layer is a first dummy semiconductor layer, and a second dummy semiconductor layer is further formed between the gate driving part and an edge of the first substrate.

21. The display panel of claim 20,
wherein the first and second dummy semiconductor layers are substantially parallel to each other.

22. The display panel of claim 18,
wherein the dummy semiconductor layer is a first dummy semiconductor layer, a second dummy semiconductor layer is further formed in the non-display region, and the first and second dummy semiconductor layers are substantially parallel to each other.

23. The display panel of claim 18, wherein:
the second substrate comprises an inner black matrix formed in the display region and an outer black matrix formed in the non-display region; and,
the gate driving part is located within an outer boundary of the outer black matrix.

* * * * *